United States Patent
Yang et al.

(10) Patent No.: US 7,750,070 B2
(45) Date of Patent: Jul. 6, 2010

(54) PROCESS FOR PRODUCTION OF CLAY NANOCOMPOSITE

(75) Inventors: Xiaoping Yang, Streetsboro, OH (US); Joseph John Kulig, Tallmadge, OH (US); Dane Kenton Parker, Coshocton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 780 days.

(21) Appl. No.: 11/641,513

(22) Filed: Dec. 19, 2006

(65) Prior Publication Data

US 2008/0146719 A1 Jun. 19, 2008

(51) Int. Cl.
*C08K 3/00* (2006.01)

(52) U.S. Cl. .................. 524/445; 526/347.1; 526/335

(58) Field of Classification Search ........... 524/445; 526/347.1, 335
See application file for complete search history.

(56) References Cited

U.S. PATENT DOCUMENTS

| | | | |
|---|---|---|---|
| 2,561,215 A | 7/1951 | Mighton | 154/43 |
| 2,615,826 A | 10/1952 | Mallory et al. | 154/46 |
| 2,817,616 A | 12/1957 | Wolfe | 154/52 |
| 5,552,469 A | 9/1996 | Beall et al. | 524/445 |
| 5,883,173 A | 3/1999 | Elspass et al. | 524/446 |
| 6,710,111 B2 | 3/2004 | Kuo et al. | 524/445 |
| 6,759,463 B2 | 7/2004 | Lorah et al. | 524/445 |
| 6,759,464 B2 | 7/2004 | Ajbani et al. | 524/445 |
| 6,861,462 B2 | 3/2005 | Parker et al. | 524/445 |
| 2005/0065266 A1 | 3/2005 | Yang et al. | 524/445 |
| 2005/0215693 A1 | 9/2005 | Wang et al. | 524/445 |
| 2005/0277723 A1 | 12/2005 | Gong et al. | 524/445 |
| 2006/0100339 A1 | 5/2006 | Gong et al. | 524/445 |

OTHER PUBLICATIONS

Wang et al., Preparation and Characterization of Rubber-Clay Nanocomposites, Journal of Applied Polymer Science, vol. 78, 1879-1883 (2000).*
Internet Article, Zeon Corporation, Synthetic Latices Product List, Published as early as Mar. 2, 2006.
Omnova Solutions Inc., GenTac® VinylPyridine Latex, 2004.
Vol. 78, pp. 1879-1883, Journal of Applied Polymer Science, *Preparation and Characterization of Rubber-Clay Nanocomposites*, Jan. 10, 2000.
Vol. 21, No. 7, pp. 1142-1145, Chemical Journal of Chinese Universities, 1995-2005.

* cited by examiner

*Primary Examiner*—Robert D. Harlan
(74) *Attorney, Agent, or Firm*—John D. DeLong

(57) ABSTRACT

A process of preparing a nanocomposite comprised of an elastomer and at least partially exfoliated, intercalated water-swellable clay.

9 Claims, No Drawings

PROCESS FOR PRODUCTION OF CLAY NANOCOMPOSITE

BACKGROUND OF THE INVENTION

The addition of fillers to polymers is a common industrial practice. Its purpose is generally twofold; to reduce the overall cost of the composite while concurrently bringing about improvement in, for example, mechanical properties such as wear, hardness, tensile modulus, tear etc. It is also known that by using filler particles of very small dimensions (<100 nm), polymer composite properties may be improved with a much lower concentration of filler, typically 2 to 10 parts by weight per 100 parts by weight of rubber compared to 30 to 100 parts by weight per 100 parts by weight of rubber with normally micron sized filler particles. Common inorganic nanometer or "nano-scale" fillers possess extremely high surface area with high surface energy. For this reason, it is important that this surface energy be overcome or dissipated in some manner to allow efficient compatibilization and dispersion of the nano-filler into the polymeric substrate to avoid filler aggregation during processing and finishing of the final product. Formation of organic-inorganic nanocomposites based on clays or layered silicates such as montmorillonite is known. Generally, these clays are normally modified by alkyl ammonium ions or amines through an ion-exchange process. The large organic ions displace the smaller inorganic ions (e.g. sodium ion) that reside between the negatively charged silicate platelets thus expanding the interplate distances while concurrently making the modified clay more hydrophobic. The end result is a modified clay that is more readily dispersible in a polymeric substrate. In some instances, the new nanocomposite has an intercalated structure wherein the clay is well dispersed with no large aggregates but still largely retains its layered (but expanded) domain morphology. The expanded layered structure will allow some of the polymeric substrate to interpenetrate between the stacked platelets which, in turn, often results in physical property improvements. While the intercalated polymer-clay domain structure is an improvement, it does not reach the ultimate state of dispersion commonly referred to as exfoliation. When an exfoliated state is achieved as evidenced by a complete lack of an X-ray diffraction pattern, the clay is delaminated and the layered structure of the clay is completely disrupted. Individual platelets in this state now have little affinity for each other relative to the polymeric substrate. The attainment of the exfoliated state will provide the most improvement in properties with the lowest level of filler possible.

SUMMARY OF THE INVENTION

The present invention is directed to a process of preparing a nanocomposite comprised of an elastomer and at least partially exfoliated, intercalated water-swellable clay, comprising the steps of (A) forming a first blend of water-swelled clay and anionic polymer particle emulsion by blending:

(1) an aqueous mixture comprised of water and a multilayered water-swellable clay, exclusive of an intercalant for said clay, wherein said water-swellable clay is comprised of a plurality of stacked platelets with water-expanded galleries between said platelets, wherein said galleries contain naturally occurring cationic ion exchangeable ions therein, and (2) an emulsion of anionic synthetic vinylpyridine-styrene-butadiene terpolymer (VPSBR) elastomer particles as an aqueous pre-formed elastomer emulsion having a pH in a range of from about 6 to about 11, comprised of anionic elastomer particles (elastomer particles having anions on the surface derived from an anionic surfactant) prepared by aqueous free radical induced polymerization of monomers in the presence of a free radical generating polymerization initiator and non-polymerizable anionic surfactant, wherein said synthetic elastomer particles are derived from an aqueous polymerization of said monomers comprising from about 0.1 to about 40 weight percent of styrene, from about 60 to about 100 weight percent of 1,3-butadiene, and from about 0.1 to about 8 percent by weight of vinylpyridine monomers which have the structural formula:

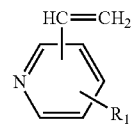

wherein $R_1$ represents a hydrogen atom or a straight chain or branched alkyl group containing 1 to 4 carbon atoms; and (B) blending with said first blend an aqueous mixture comprised of water and inorganic acid having a pH in a range of about 1 to about 4.

DETAILED DESCRIPTION OF THE INVENTION

In one aspect of this invention, a masterbatch-derived rubber composition is provided as such a nanocomposite, where the nanocomposite may be referred to herein as a masterbatch, and where the masterbatch nanocomposite, with its dispersed partially exfoliated clay particle content, is blended with at least one additional elastomer to form the resultant rubber composition.

In another aspect of this invention, an article of manufacture is provided, such as for example tires and industrial product such as, for example, conveyor belts, power transmission belts and hoses, which has at least one component of a rubber composition comprised of the nanocomposite or comprised of said rubber composition which contains such nanocomposite (or masterbatch if the nanocomposite is referred to as a masterbatch).

It is considered herein that such rubber composition containing such nanocomposite, when used to replace a portion of the normally used carbon black or silica reinforcement, may be particularly adaptable for use as a component for a tire, particularly a tire tread. Reduced hysteresis (e.g. an increase in 100° C. rebound value or a reduction in tangent delta value) is desired to promote a reduction in heat buildup of the tire, and therefore an increase in tire durability. The weight reductions possible by replacing a portion of the carbon black or silica reinforcement of the rubber composition can promote an increase in vehicular fuel economy. The reduction in component weight combined with the aforesaid promoted tire durability also allows the tire manufacturer greater flexibility in tire design to make the overall tire more durable, especially in applications where tire weight is severely limited.

Nanocomposites composed of elastomers and a dispersion of particles of intercalated, and possibly partially exfoliated, water-swellable clay have heretofore been prepared by various methods.

For example, such nanocomposites have been prepared by first pre-intercalating a multi-layered, hydrophilic water-swellable clay in water which contains an intercalating compound (e.g. a quaternary ammonium salt) to intercalate the clay by causing an ion exchange to occur in which the quaternary ammonium salt displaces one cation contained within the galleries of the multi-layered clay. The resultant intercalated clay particles are dried and then mixed with an elastomer to form a dispersion thereof within the elastomer. To a small extent, the layers of the intercalated clay may become delaminated, or exfoliated, into individual platelets, which may include delaminated, or exfoliated, stacks of platelets, either during the intercalation process or upon subsequent high shear mixing with the elastomer.

Such a method is considered herein to be excessively dependent upon high shear mixing of the intercalated clay into the elastomer composition and relatively inefficient insofar as obtaining a good overall dispersion of substantially exfoliated platelets of an intercalated water-swellable clay within an elastomer matrix and therefore not likely to be relatively cost efficient method of nanocomposite preparation.

Another method of nanocomposite preparation involves utilizing an ion exchange phenomenon between cationically exchangeable ions contained within the galleries of stacked platelets of a water-swellable clay composed of multiple layers of negatively charged stacked platelets and cationically (positively) charged elastomer particles contained in an aqueous latex thereof. By such method the exfoliated platelets are thereby contemplated as being created in situ within the latex.

In practice, a maximized state of delamination and exfoliation of the clay into individual platelets is considered herein to be desirable in order to enhance reinforcement of elastomer-based components of articles of manufacture, particularly tires and more particularly tire treads.

It is therefore desired herein to provide a significantly exfoliated water-swellable clay in or from a relatively low shear medium, for example a latex, prior to dry blending under high shear conditions with an elastomer composition.

Accordingly, for this invention, a process of creating a dispersion of exfoliated clay platelets in an elastomer is provided which is considered herein to be a significant departure from past practice.

In practice, for this invention, a dispersion of at least partially exfoliated clay particles in an elastomer is provided by blending a water slurry of water-swellable multilayered clay (e.g. a smectite clay) with an emulsion latex of anionic (negatively charged) vinylpyridine-styrene-butadiene (VPSBR) terpolymer elastomer particles having a pH in a range of about 6 to about 11, preferably about 7 to about 10, and thereafter lowering the pH of the mixture to protonate the VPSBR to effect an ion exchange by the protonated vinylpyridine of the VPSBR with cationically exchangeable ion(s) contained within the galleries of the stacked platelets of the clay and thereby delaminate the clay and cause at least a partial exfoliation of the clay into individual clay platelets, and to coagulate the latex, all in situ. In practice, a small amount of acid, or salt/acid combination, is added to reduce the pH of the emulsion to a value, for example, in a range of from about 1 to about 4, preferably to about 1 to about 2, to aid in coagulating (precipitating) the elastomer particles and at least partially exfoliated clay as a nanocomposite.

The nanocomposite may then simply be recovered by drying the coagulant, or precipitate.

In practice, the anionic (negatively charged) VPSBR elastomer particles may be formed, for example, by use of anionic surfactant(s) to stabilize the emulsion. Such use of anionic surfactants for such purpose is well known to those having skill in such art.

In practice, an acid, or salt/acid combination, often is used to reduce the pH of an anionic latex from a pH, for example, in a range of about 6 to about 11 to a more acidic value in a range of, for example, of about 1 to about 4 to therefore promote protonation of the VPSBR units derived from vinylpyridine monomer and consequent delamination of the clay, and a destabilization of the emulsion and promoting a coagulation, or precipitation, of the elastomer particles from the emulsion. A representative example of an acid, or salt/acid combination, for such purpose is, for example, sulfuric acid or a combination of sodium chloride and sulfuric acid.

Further, the aforesaid use of an acid, or salt/acid combination, can be beneficially used to aid in the coagulation process by reduction of the pH of the VPSBR emulsion/clay mixture while also inducing delamination of the clay by the consequently protonated VPSBR units derived from vinylpyridine monomer.

Accordingly, this invention is considered herein to be a significant departure from past practice by use of anionic VPSBR elastomer particles and water swelled, water-swellable clay, together with an acid, or salt acid combination, to effect both a coagulation/precipitation of the elastomer/clay particle composite and an in situ formation of ionic bonding between the elastomer and partially exfoliated clay particles.

Therefore, a significant aspect of this invention is the delamination or exfoliation of the water-swelled clay contained in an anionic emulsion of VPSBR elastomer particles, wherein the water-swelled clay contains cationically exchangeable ions (e.g. sodium ion) within the galleries between its platelets and wherein the delamination is accomplished by protonating the VPSBR units derived from vinylpyridine monomer to effect an ion transfer between the ions within the clay galleries and the protonated VPSBR units derived from vinylpyridine monomer.

A further significant aspect of the invention is the substantially simultaneous precipitation (coagulation) of the elastomer which contained dispersion of the delaminated (and at least partially exfoliated) clay particles as a nanocomposite which is aided by the addition of the acidic water to destabilize the emulsion.

Another significant aspect of the invention is the strong association between the elastomer and the largely delaminated clay particles through the ionic bonding of vinylpyridine along the elastomer chains and clay surface. This ionic association provides strong interphase which ensures better load transfer and better mechanical properties.

In an additional departure from past practice, the water-swellable clay is introduced into the emulsion of anionic VPSBR elastomer particles in a pre-water swelled form but without being first intercalated with an intercalant (e.g. a non-pre-intercalated clay as being a water-swelled clay which is not first intercalated with a quaternary ammonium salt to effect an ion exchange prior to its addition to the emulsion) so that the protonation of the vinylpyridine of the VPSBR is relied upon to delaminate and exfoliate the water-swelled clay by the aforesaid ion exchange in situ within the emulsion of anionic elastomer particles.

For the practice of this invention, it is intended that the clay delamination and exfoliation process for this invention is conducted in the presence of the anionic (negatively charged) elastomer latex particles and to the exclusion of cationic elastomer particles contained in a cationic surfactant.

In a summary, then, the process of this invention differs significantly from past practice, at least in part because the water-swellable clay (e.g. smectite clay) is (A) not intercalated during the polymerization of the monomers, (B) not intercalated by physically blending the smectite clay with the elastomer after it has been coagulated and recovered as a dry elastomer, (C) not intercalated by blending a smectite clay which has been pre-intercalated by treatment with a quaternary ammonium salt prior to blending the pre-intercalated clay with the elastomer, and (D) strongly associated with elastomer matrix through ionic bonding with protonated vinylpyridine groups.

Indeed, while some elements of the process of this invention might appear to be somewhat simplistic in operational nature, it is considered herein that the overall technical procedural application is a significant departure from past practice.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

In accordance with this invention, a process of preparing a nanocomposite comprised of an elastomer and at least partially exfoliated water-swellable clay, (in situ within an elastomer host of anionic elastomer particles), comprises (A) forming a first blend of water-swelled clay and anionic polymer particle emulsion by blending:
 (1) an aqueous mixture comprised of water and a multilayered water-swellable clay, exclusive of an intercalant for said clay (e.g. exclusive of a quaternary ammonium salt), wherein said water-swellable clay is comprised of a plurality of stacked platelets with water-expanded (swollen) galleries between said platelets, wherein said galleries contain naturally occurring cationically ion exchangeable ions therein, (e.g. montmorillonite clay which contains sodium ions within said galleries), and
 (2) an emulsion of anionic synthetic vinylpyridine-styrene-butadiene terpolymer (VPSBR) elastomer particles as an aqueous pre-formed elastomer emulsion having a pH in a range of from about 6 to about 11, preferably about 7 to about 10, comprised of anionic elastomer particles (elastomer particles having anions on the surface derived from an anionic surfactant) prepared by aqueous free radical induced polymerization of monomers in the presence of a free radical generating polymerization initiator and non-polymerizable anionic surfactant,
 wherein said synthetic elastomer particles are derived from an aqueous polymerization of a vinylpyridine monomer, styrene and 1,3-butadiene, and (B) blending with said first blend an aqueous mixture comprised of water and inorganic acid having a pH in a range of about 1 to about 4.

Water-swellable clays considered for use in this invention which are clays composed of a plurality of stacked platelets (e.g. very thin silicate based platelets) which contain cationically exchangeable ions in the galleries between such platelets. Representative of such clays are water swellable smectite clays, vermiculite based clays and mica based clays. Included are both naturally occurring clays and synthetic clays. Also included in suitable clays include sepiolite and attapulgite clays. Suitable synthetic clays include the Laponite® clays from Southern Clay Products. Preferably such water-swellable clays are smectite clays. Representative of smectite clays are, for example, montmorillonite, hectorite, nontrite, beidellite, volkonskoite, saponite, sauconite, sobockite, stersite, and sinfordite clays of which montmorillonite and hectorite clays are preferred. For various exemplary smectite clays, see for example U.S. Pat. No. 5,552,469. Such cationically exchangeable ions contained in such galleries are typically comprised of at least one of sodium ions and potassium ions, which may also include calcium ions and/or magnesium ions, although it is understood that additional cationically exchangeable ions may be present. Typically, montmorillonite clay is preferred which contains sodium ions in such galleries, although it is understood that a minor amount of additional cationically exchangeable ions may be contained in such galleries such as for example, calcium ions.

In one aspect, a water swellable clay, such as for example a smectite clay such as, for example, a montmorillonite clay, for use in this invention, might be described, for example, as a naturally occurring clay of a structure which is composed of a plurality of stacked, thin and relatively flat, layers, where such individual layers may be of a structure viewed as being composed of very thin octahedral shaped alumina layer sandwiched between two very thin tetrahedrally shaped silica layers to form an aluminosilicate structure. Generally, for such aluminosilicate structure in the naturally occurring montmorillonite clay, some of the aluminum cations ($Al^{+3}$) are viewed as having been replaced by magnesium cations ($Mg^{+2}$) which results in a net negative charge to the platelet layers of the clay structure. Such negative charge is viewed as being balanced in the naturally occurring clay with hydrated sodium, lithium, magnesium, calcium and/or potassium cations, usually primarily sodium ions, within the spacing (sometimes referred to as "galleries") between the aforesaid aluminosilicate layers, or platelets.

In practice, the degree of exfoliation of the clay platelets can be qualitatively evaluated, for example, by wide angle X-ray diffraction (WAXD) as evidenced by a substantial absence of an X-ray peak which is a well known method of such evaluation. Such evaluation relies upon observing WAXD peak intensities and changes (increase) in the basal plane spacing between platelets.

In practice, preferably from about 0.1 to about 80, alternately about 5 to about 20, parts by weight of said water swelled clay is added to said anionic emulsion per 100 parts by weight of said elastomer particles, depending somewhat upon the nature of the clay including the cationically exchangeable ions within the galleries between the layers of the clay, and the VPSBR elastomer.

Accordingly, the resulting nanocomposite may contain about 0.1 to about 80, alternately about 5 to about 20, parts by weight of at least partially exfoliated clay particles per 100 parts by weight of the elastomer host.

It is to be appreciated that, in practice, a synthetic emulsion of anionic VPSBR elastomer particles may be prepared, for example, by emulsion polymerization of a vinylpyridine monomer, styrene and 1,3-butadiene monomers, in a water emulsion medium via a free radical polymerization in the presence of an anionic surfactant.

It is to be further appreciated that a VPSBR made by the process described herein comprises units derived from vinylpyridine monomer, styrene and 1,3-butadiene monomers, in the sense that upon incorporation into the VPSBR polymer chain, the VPSBR units derived from the monomers differ in structure somewhat from the monomers, owing to the polymerization reaction. Thus, reference herein to "units derived from monomers" and the like is understood to mean units incorporated into the VPSBR chain that have their origin in the vinylpyridine monomer, styrene and 1,3-butadiene monomers.

In further accordance with this invention, said monomers for said synthetic elastomer particles are derived from aqueous emulsion polymerization of vinylpyridine monomer, styrene and 1,3-butadiene monomers comprised of from about 0.1 to about 40, alternately about 15 to about 35, weight percent styrene monomer; from about 0.1 to about 8, alternately from about 0.5 to about 4, weight percent vinylpyridine monomer, and the balance 1,3 butadiene monomer.

In one embodiment, suitable vinylpyridine monomers have the structural formula:

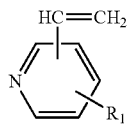

wherein $R_1$ represents a hydrogen atom or a straight chain or branched alkyl group containing 1 to 4 carbon atoms. In one embodiment, the vinylpyridine monomer may be selected from 2-vinylpyridine, 3-vinylpyridine, 4-vinylpyridine, 6-methyl-2-vinylpyridine, 6-methyl-3-vinylpyridine, 5-methyl-2-vinylpyridine and 5-ethyl-2-vinylpyridine, and mixtures thereof. Of these 4-vinylpyridine is preferred.

Representative examples of anionic surfactants for the preparation of the synthetic emulsion of anionic VPSBR elastomer particles may be found, for example, in *McCutcheon's*, Volume 1, "Emulsifiers & Detergents", North American Edition, 2001, Pages 291 and 292, with representative examples of non-ionic surfactants shown on Pages 294 through 300 and examples of cationic surfactants shown on Pages 300 and 301.

For the practice of this invention, cationic surfactants for the preparation of the synthetic elastomer particles are to be excluded.

As hereinbefore described, in practice, the emulsion of anionic VPSBR elastomer particles may be prepared, for example, by a free radical polymerization of the monomers in a water-based medium in the presence of a free radical initiator and said anionic surfactant(s). A general description of an aqueous emulsion polymerization of styrene and 1,3-butadiene directed to an anionic surfactant (emulsifier) based polymerization, may be found, for example, in *The Vanderbilt Rubber Handbook*, 1978 Edition, Pages 55 through 61. A general description of the micelle-generating substances (emulsifiers, surfactants, soaps) is given in *Emulsion Polymerization Theory and Practice* by D. C. Blackley, 1975, Pages 251 through 328. It is to be understood that the procedures are fully applicable to the present VPSBR.

The use of various free radical generating initiators for aqueous emulsion of styrene/butadiene monomer systems to form styrene/butadiene elastomers is well known to those having skill in such art.

In practice, said free radical generating polymerization initiator for preparation of said synthetic elastomer particles may be selected from, for example, (A) dissociative initiators, or (B) redox initiators as described in the above referenced "Emulsion Polymerization Theory and Practice."

Such free radical generating polymerization initiators are well known to those having skill in such art.

The practice of emulsion polymerization of SBR (and by extension, of VPSBR) may be classified into two types. The hot polymerization is based on dissociative initiators and is typically run at 50° C. to 70° C. The cold polymerization is based on redox initiators and is typically run at temperatures less than 10° C., preferably 5° C. The type of process sets the polymerization temperature. The polymerization temperature affects the macrostructure and microstructure. Emulsion SBR prepared via a hot polymerization will have a trans-1,4-butadiene content of 60 percent or less and higher branching. Emulsion SBR prepared via a cold process will have a higher trans-1,4-butadiene content and lower branching. The emulsion SBR from cold polymerization process will typically have an trans-1,4-butadiene content of greater than about 60 percent by weight, based on the polybutadiene content of the polymer. Therefore, in one embodiment, the trans-1,4-butadiene content of the VPSBR ranges from about 60 percent to about 80 percent by weight. In one embodiment, the trans-1, 4-butadiene content of the VPSBR ranges from about 65 percent to about 75 percent. In one embodiment, the trans-1, 4-butadiene content of the VPSBR ranges from about 68 percent to about 72 percent.

Higher trans-1,4 content in excess of about 72 percent in the VPSBR may be achieved using a cryogenic polymerization as disclosed for example in J. L. Binder, *Ind. Eng. Chem.* 46, 1727 (1954).

In one preferred embodiment, the free radical polymerization is a so-called "cold" polymerization, as opposed to a hot polymerization. The amount of free radical initiator used is sufficient to give a reasonable reaction rate, with monomer conversion up to about 60 to 65 percent in 6 hours. In contrast to the hot polymerization typically used commercially for RFL adhesive-type vinylpyridine-styrene-butadiene latexes with about 15 percent by weight of 2-vinylpyridine in the polymer, the cold polymerization results in a VPSBR with a lower amount of gel and branching resulting in desirable physical properties for the present tire application.

In practice, said inorganic acid for adding to said first blend may be selected from mineral acids such as for example, sulfuric acid, nitric acid, hydrochloric acid and phosphoric acid. Also, organic acids such as, for example, formic acid, and acetic acid may be used, although the mineral acids are preferred.

In practice, for said acid/salt combination, said aqueous mixture of water and acid, preferably an inorganic acid, may, if desired, also contain a water soluble salt selected from, for example, at least one of sodium chloride, potassium chloride, sodium sulfate, potassium sulfate, magnesium chloride, magnesium sulfate, aluminum sulfate, potassium carbonate and tripotassium phosphate.

In practice, said water for said aqueous mixture of water and water swellable clay is preferably provided in a de-mineralized form, or at least without an appreciable mineral content.

In practice, it is to be appreciated that the method of this invention may desirably rely, at least in part, on the use of the acid or salt/acid combination to aid in destabilizing the anionic emulsion and thereby coagulating/precipitating the anionic elastomer particles/clay particle mixture. At the same time, the acid or salt/acid combination acts to protonate the VPSBR units derived from vinylpyridine monomer, with subsequent ion exchange with cations in the clay by the protonated moiety to delaminate the clay.

In further accordance with this invention, a nanocomposite is provided which is comprised of at least the VPSBR which contains a dispersion therein of at least partially exfoliated clay particles.

In additional accordance with this invention, a nanocomposite comprised of an elastomer which contains a dispersion therein of said in situ formed partially exfoliated water swellable clay is provided as prepared by the process of this invention.

Accordingly, as hereinbefore discussed, said nanocomposite may be comprised of, based on 100 parts by weight of the elastomer host, from about 0.1 to about 80, about 5 to about 80 or, alternately about 5 to about 20, parts by weight of said in situ formed at least partially exfoliated clay.

In practice, the resulting VPSBR/clay nanocomposite may be blended with additional elastomers to create a rubber composite. For example, rubber composites may be prepared by blending the VPSBR/clay nanocomposite with various additional diene-based elastomers such as, for example, homopolymers and copolymers of monomers selected from isoprene and 1,3-butadiene and copolymers of at least one diene selected from isoprene and 1,3-butadiene and a vinyl aromatic compound selected from styrene and alpha methylstyrene, preferably styrene.

Representative of such additional conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), vinyl polybutadiene having a vinyl 1,2-content in a range of about 15 to about 90 percent, isoprene/butadiene copolymers, and styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

Addition of additional elastomers to the nanocomposite may be accomplished by adding the additional elastomer or elastomers during the compounding step, as a dry blend, or as a latex prior to coagulation of the VPSBR/clay mixture. Thus it is envisioned that latexes of the above mentioned additional elastomer may be added to the VPSBR latex to make a clay masterbatch.

In the further practice of this invention, additional particulate reinforcement for the nanocomposite and/or rubber composite, in addition to the exfoliated platelets, may also include carbon black and/or particulate synthetic amorphous silica, particularly precipitated silica, or a combination of carbon black and such amorphous silica, usually of an amount in a range of about 5 to about 100 alternately about 5 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

In further accordance with this invention, a rubber composition is provided which comprises, based upon parts by weight per 100 parts by weight elastomer (phr):

(A) about 5 to about 150, alternately about 5 to about 115, phr of the nanocomposite of this invention, (B) from zero to about 95, alternately from about 5 to about 95, phr of at least one additional diene-based elastomer, so long as the total of the elastomer contained in said nanocomposite and said additional diene-based elastomer is 100 parts by weight, (C) from zero to about 80, alternately from about 10 to about 80, alternately about 10 to about 60 phr of at least one additional reinforcing particulate filler selected from carbon black, precipitated silica aggregates, silica-containing carbon black which contains domains of silica on its surface, and mixtures thereof, and, optionally (D) a coupling agent which contains a moiety reactive with hydroxyl groups (e.g. silanol groups) contained on the peripheral edges of the surface of the platelets of said exfoliated platelets and reactive with hydroxyl groups (e.g. silanol groups) contained on the surface of said precipitated silica and said silica-containing carbon black, if said silica and/or silica-containing carbon black is used, and another moiety which is interactive with said diene-based elastomer(s) of the elastomer(s) of said nanocomposite and at least one of said additional elastomers.

In accordance with this invention, a nanocomposite is provided which is comprised of at least one elastomer which contains a dispersion therein of at least partially exfoliated clay particles.

In additional accordance with this invention, a rubber composite, or composition, is provided as a blend of at least one additional elastomer and said nanocomposite, as well as a process of preparing a rubber composite by preparing said nanocomposite and then blending at least one elastomer, particularly a diene-based elastomer, therewith.

In further accordance with this invention an article of manufacture is provided having at least one component comprised of said nanocomposite and/or said rubber composite, or rubber composition, as well as a process of preparing an article of manufacture by preparing said nanocomposite and/or said rubber composite and then preparing said article of manufacture.

In additional accordance with this invention, an article of manufacture is provided having at least one component comprised of a nanocomposite comprised of at least one elastomer which contains a dispersion of at least partially exfoliated clay particles, and particularly including the said nanocomposite.

In further accordance with this invention said article of manufacture includes industrial product such as, for example, and the following are not intended to be limiting, at least one of a conveyor belt, a power transmission belt, hose, motor mounts and tank track pads which have at least one component comprised of said nanocomposite and/or said rubber composite.

In additional accordance with this invention, a tire is provided having at least one component comprised of said nanocomposite and/or said rubber composite. In one aspect of the invention, said component may be, for example, a tire tread, tread base, tire innerliner, tire sidewall insert (particular a tire sidewall supporting and/or stiffening component positioned within the tire sidewall) as well as a process of preparing a tire by preparing said nanocomposite and/or said rubber composite and then preparing said tire.

In further accordance with this invention, a tire is provided having at least one component, such as for example a tread, of a rubber composition comprised of at least one diene-based elastomer and the nanocomposite of this invention wherein said rubber composition contains a carbon black reinforcing filler and wherein at least a portion of said carbon black reinforcement is replaced by said partially exfoliated clay particles contained in said nanocomposite. Exemplary thereof is such rubber composition which contains at least 1, and preferably a range of about 3 to about 10, phr of said partially exfoliated clay particles.

In practice, it may be desired for the weight ratio of the elastomer of said nanocomposite to an additional elastomer to be in a range, for example, of from about 5/1 to about 1/5, although higher or lower ratios may be used, depending upon circumstances, to prepare a rubber composition for an article of manufacture. However, it is to be appreciated that, depending upon circumstances, the nanocomposite may be used without inclusion of any additional elastomer to produce a rubber composition for an article of manufacture.

In practice, it is contemplated that use of such in situ formed partially exfoliated clay particles for the rubber reinforcement may present an increased reinforcement efficiency for elastomers, particularly diene-based elastomers in a manner that a portion of normally used carbon black reinforcement, or even silica reinforcement, may be replaced so that the overall particulate reinforcement for the elastomer, or rubber product is reduced and in some cases, substantially reduced. For example, it is contemplated that a weight ratio of such clay particles to replaced carbon black and/or amorphous, precipitated silica, may range from about 6/1 to somewhat greater than about 1/1, and alternately such a weight ratio in a range of from about 5/1 to about 1.5/1, to often achieve substantially similar or equal physical properties of the rubber composition, all depending upon the rubber composition itself and its intended use. Thus one part by weight of the in situ formed at least partially exfoliated clay particles might replace from at least one and perhaps up to 6 parts by weight carbon black and/or silica reinforcement. Thus, it is considered herein that, in general, such clay particles may have an increased reinforcement efficiency for diene-based elastomers as compared to rubber reinforcing carbon black and/or amorphous, precipitated silica.

Commonly employed synthetic amorphous silica, or siliceous pigments, used in rubber compounding applications can be used as the silica in this invention, wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3$/100 g, and more usually about 100 to about 300 $cm^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from Degussa AG with, for example, designations VN2, VN3 and Ultrasil 7005, as well as other grades of silica, particularly precipitated silicas, which can be used for elastomer reinforcement.

As hereinbefore discussed, various coupling agents may be used if desired. For example, a bis(3-trialkoxysilylalkyl) polysulfide having an average of 2 to 2.6 or of 3.5 to 4 connecting sulfur atoms in its polysulfide bridge, preferably from 2 to 2.6 sulfur atoms, may be used and particularly a bis(3-triethoxysilylpropyl) polysulfide.

It is readily understood by those having skill in the art that the nanocomposite, or rubber composite, would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and, optionally, reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is typically conducted in the presence of a sulfur vulcanizing agent, although peroxide and other non-sulfur curing agents may sometimes be suitably employed to vulcanize the elastomers. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to preparation of nanocomposites as well as rubber composites which contain such nanocomposites as well as manufactured articles, including tires, which have at least one component comprised of said nanocomposites and/or rubber composites.

The preparation of a rubber composite, namely the mixing of the rubber composition can be accomplished by methods known to those having skill in the rubber mixing art. For example, the ingredients are typically mixed in at least two stages, namely, at least one non-productive stage followed by a productive mix stage. The curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and optionally additional reinforcing fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

For the purposes of the following examples, the control Sample 1 was taken to be a commercially available vinylpyridine-styrene-butadiene latex containing 15 percent by weight of 2-vinylpyridine made by a hot polymerization to 100 percent conversion.

EXAMPLE I

Preparation of Anionic Latex of Vinyl Pyridiene/Styrene/Butadiene Elastomer (VPSBR) by Hot Polymerization An anionic aqueous latex of an emulsion polymerization prepared vinylpyridine-styrene-butadiene terpolymer elastomer (VPSBR) having a basic pH in a range of about 10.5 to 11.5 was synthesized by copolymerizing styrene, 1,3 butadiene, and 2- or 4-vinylpyridine monomers in an aqueous medium. The amount of each monomer and the isomer of vinylpyridine used is shown in Table 1.

For the preparation of the VPSBR latex Sample 2, a hot (65° C.) emulsion polymerization process was conducted in batch.

The monomer charge, together with an aqueous soap (surfactant) solution, polymerization modifier and initiator were charged to the reactor.

The soap solution was a mixture of mixed C14-C18 and C16-C18 unsaturated fatty acids, potassium salts (in an amount of about 2.66 phm), a potassium salt of disproportionated rosin acid (in an amount of about 1.4 phm), potassium chloride (in an amount of about 0.23 phm), tripotassium phosphate (in an amount of about 0.05 phm). The initiator was sodium persulfate (0.2 phm).

The polymerization was terminated at a conversion of the monomers to polymer of about 62 to 65 percent with an isopropyhydroxylamine (in an amount of about 0.08 phm), 0.018 phm Tamol SN (sodium salt of condensed naphthalene sulfonic acid) and water (about 8 phm).

TABLE 1

Monomer Amounts for VPSBR Hot Polymerization

| Sample No. | Styrene | Butadiene | 2-Vinylpyridine |
|---|---|---|---|
| 2 | 28 | 70 | 2 |

EXAMPLE II

Preparation of Anionic Latex of Vinyl Pyridiene/Styrene/Butadiene Elastomer (VPSBR) by Cold Polymerization An anionic aqueous latex of an emulsion polymerization prepared vinylpyridine-styrene-butadiene terpolymer elastomer (VPSBR) having a basic pH in a range of about 10.5 to 11 was synthesized by copolymerizing styrene, 1,3 butadiene, and 2- or 4-vinylpyridine monomers in an aqueous medium. The amount of each monomer and the isomer of vinylpyridine used is shown in Table 2.

The monomer charge, together with an aqueous activator solution, aqueous soap (surfactant) solution, polymerization modifier and initiator were charged to the batch reactor.

The activator solution was a mixture of ferrous sulfate heptahydrate (in an amount of about 0.009 phm) where phm is parts by weight per 100 parts by weight of monomer sodium formaldehyde sulfoxylate dihydrate (in an amount of about 0.07 phm), tetrasodium ethylenediaminetetraacetate (in an amount of about 0.035 phm) and water (in an amount of about 9.97 phm). The soap solution was a mixture of mixed C14-C18 and C16-C18 unsaturated fatty acids, potassium salts (in an amount of about 2.66 phm), a potassium salt of disproportionated rosin acid (in an amount of about 1.4 phm), potassium chloride (in an amount of about 0.23 phm), tripotassium phosphate (in an amount of about 0.05 phm). The initiator was pinane hydroperoxide (in an amount of about 0.05 phm).

The polymerization was terminated at a conversion of the monomers to polymer of about 62 to 65 percent with an isopropyhydroxylamine (in an amount of about 0.08 phm), 0.018 phm Tamol SN (sodium salt of condensed naphthalene sulfonic acid) and water (about 8 phm).

TABLE 2

Monomer Amounts for VPSBR Cold Polymerizations

| Sample No. | Styrene | Butadiene | 2-Vinylpyridine | 4-Vinylpyridine |
|---|---|---|---|---|
| 3 | 27.5 | 70 | 2.5 | 0 |
| 4 | 25 | 70 | 5 | 0 |
| 5 | 22.5 | 70 | 7.5 | 0 |
| 6 | 27.5 | 70 | 0 | 2.5 |
| 7 | 22.5 | 70 | 0 | 7.5 |

EXAMPLE III

Preparation of Polymer/Clay Nanocomposites

The following procedure was used to prepare nanocomposites for each of the VPSBR Samples 2-7 of Examples I and II, and for control sample 1. As mentioned previously, control Sample 1 was a commercially available vinylpyridine-styrene-butadiene latex containing 15 percent by weight of 2-vinylpyridine made by a hot polymerization to 100 percent conversion.

A dispersion of a conventional antioxidant equal to 1 phr (parts by weight per 100 parts by weight rubber) was added to the latex to about 500 grams of the VPSBR latex (19 weight percent VPSBR solids). An aqueous suspension of montomorillonite clay from Southern Clay Products (2.7 w/w percent clay) was used as received. The clay slurry (280 grams) was added to the latex all at once and thoroughly mixed at ambient temperature (about 23° C.). Three kilograms (about 6.6 pounds) of water adjusted to a pH of 2-2.5 with sulfuric acid and heated to 160° F. The clay/latex was added to the above acid solution.

A clay/VPSBR nanocomposite precipitated from the dispersion/solution considered herein as being composed of each of the VPSBR and an in situ formed at least partially exfoliated clay particles. After the addition was completed, the precipitated nanocomposite was washed with water.

The resulting washed nanocomposites were tray dried in a forced air oven at about 60° C. (about 140° F.), resulting in nanocomposites containing about 10 phr of clay in the VPSBR.

EXAMPLE IV

Preparation of Rubber Compositions

In this example, rubber compositions containing nanocomposite Samples 1 through 7 were compounded following the recipe shown in Table 3, with all amounts given in phr. VPSBR and clay were added as the masterbatch form from Examples I and II.

The compositions for the respective Samples illustrated in the Table 1 where the indicated ingredients were first mixed in an non-productive mixing stage (without curative) in an internal rubber mixer, the body temperature of the mixer was set at 100° C., the mixture dumped from the mixer and allowed to cool to below 40° C. and then mixed in a productive mixing stage (with the curative) during which the curative is added for a brief period of time, where the body temperature of the mixer was set at 60° C. in an internal rubber mixer and the resulting mixture dumped from the mixer. The terms "non-productive" mixing and "productive" mixing are well known to those having skill in the rubber mixing art.

TABLE 3

| Material | |
| --- | --- |
| Non-Productive mixing | |
| VPSBR[1] | 100 |
| Clay[2] | 10 |
| Zinc oxide | 3 |
| Stearic acid | 2 |
| Antidegradant | 1 |

TABLE 3-continued

| Material | |
| --- | --- |
| Productive mixing | |
| Sulfur | 1.6 |
| Sulfenamide accelerator[3] | 1.2 |

[1]Vinylpyridine-styrene-butadiene terpolymer, from Examples I and II
[2]Southern Clay Products Cloisite NA+, as masterbatch with VPSBR
[3]N-tert-butyl-2-benzothiazole sulfenamide

EXAMPLE V

In this example, clay nanocomposites made using VPSBR of various vinylpyridine contents are compared. Compounds of VPSBR nanocomposite Samples 1 through 7 of Example III containing 10 phr of clay were tested for various viscoelastic and physical properties with results as shown in Table 4. In Table 4, 2-VP refers to 2-vinylpyridine, and 4-VP refers to 4-vinylpyridine.

In Table 4 and tables in subsequent examples, the term "RPA" refers to a Rubber Process Analyzer as RPA 2000™ instrument by Alpha Technologies, formerly the Flexsys Company and formerly the Monsanto Company. References to an RPA 2000 instrument may be found in the following publications: H. A. Palowski, et al, *Rubber World*, June 1992 and January 1997, as well as *Rubber & Plastics News*, April 26 and May 10, 1993.

The "RPA" test results are reported as being from data obtained at 100° C. in a dynamic shear mode at a frequency of 11 hertz and at the reported dynamic strain values.

In Table 4 and tables in subsequent examples, the term "UTS" refers to "Ultimate Tensile System" using an Instron Universal Test Instrument Model 4201 and a cross-head speed of 20 inches/minute (50.8 centimeters/minute).

The tan delta values determined at various percent strains are a ratio of dynamic loss modulus to dynamic storage modulus and are normally considered to be a measure of hysteresis wherein a lower hysteresis is typically desirable as being indicative of better tire rolling resistance for a tire having a tread of the rubber composition (less resistance to rolling) and therefore associated with better vehicular fuel economy. A decrease in the tan delta value is typically a corresponding indication of a desirable decrease in hysteresis of the rubber composition.

TABLE 4

| Type | control | inv | inv | inv | inv | inv | inv |
| --- | --- | --- | --- | --- | --- | --- | --- |
| VPSBR Sample No. | 1 | 2 | 3 | 4 | 5 | 6 | 7 |
| Percent vinylpyridine | 15 | 2 | 2 | 4 | 6 | 2.5 | 7.5 |
| vinylpyridine isomer | 2-VP | 2-VP | 2-VP | 2-VP | 2-VP | 4-VP | 4-VP |
| hot or cold method | hot | hot | cold | cold | cold | cold | cold |
| RPA 150° C. | | | | | | | |
| Cure 150° C., 30 min, 1.67 Hz and 3.5 percent | | | | | | | |
| Min S' (dN * m) | 2.17 | 1.19 | 0.93 | 1.42 | 1.32 | 1.86 | 1.33 |
| S" at Min Torque (dN * m) | 0.8 | 0.48 | 0.62 | 0.71 | 0.71 | 0.79 | 0.63 |
| Max S' (dN * m) | 7 | 6.84 | 7.2 | 10.2 | 9.7 | 10.2 | 10.4 |
| S" at Max Torque (dN * m) | 1.2 | 0.5 | 0.71 | 0.95 | 1.09 | 0.29 | 0.26 |
| Time to 2 Point Rise (min) | 1.00 | 4.55 | 2.71 | 2 | 2.16 | 2.44 | 1.67 |
| Time to 25% Cure (min) | 3.72 | 16.05 | 18.49 | 12.12 | 12.46 | 15.25 | 4.89 |
| Time to 90% Cure (min) | 18.8 | 24.8 | 26.6 | 20.6 | 21 | 25.9 | 14 |
| Cured Strain Sweep at 100 C. and 1 Hz | | | | | | | |
| G' at 1% (MPa) | 1.51 | 1.14 | 1.42 | 1.85 | 1.82 | 1.59 | 1.69 |
| G' at 5% (MPa) | 1.38 | 1.11 | 1.34 | 1.75 | 1.73 | 1.55 | 1.6 |
| G' at 10% (MPa) | 1.27 | 1.08 | 1.27 | 1.67 | 1.63 | 1.53 | 1.57 |

TABLE 4-continued

| Type | control | inv | inv | inv | inv | inv | inv |
|---|---|---|---|---|---|---|---|
| G' at 15% (MPa) | 1.18 | 1.06 | 1.22 | 1.06 | 1.54 | 1.5 | 1.53 |
| G' at 50% (MPa) | 0.90 | 0.93 | 0.93 | 1.22 | 1.17 | 1.27 | 1.29 |
| Tan Delta at 1% | 0.148 | 0.079 | 0.112 | 0.095 | 0.102 | 0.030 | 0.038 |
| Tan Delta at 5% | 0.161 | 0.085 | 0.127 | 0.105 | 0.111 | 0.032 | 0.039 |
| Tan Delta at 10% | 0.165 | 0.088 | 0.131 | 0.114 | 0.118 | 0.032 | 0.041 |
| Tan Delta at 15% | 0.165 | 0.091 | 0.133 | 0.119 | 0.126 | 0.033 | 0.042 |
| Tan Delta at 50% | 0.162 | 0.106 | 0.157 | 0.16 | 0.153 | 0.054 | 0.062 |
| Tensile Properties (UTS, cured 150° C. for 20 minutes) | | | | | | | |
| 50% Modulus (MPa) | 2.91 | 1.83 | 2.02 | 2.66 | 3.01 | 3.01 | 4.81 |
| 100% Modulus (MPa) | 5.42 | 3.49 | 3.3 | 4.83 | 5.75 | 6.33 | 11.71 |
| 200% Modulus (MPa) | 10.62 | 7.93 | 6.72 | 10.49 | 12.32 | 15.09 | — |
| 300% Modulus (MPa) | — | — | 10 | 15.1 | — | — | — |
| Tensile Strength (MPa) | 12.5 | 11.1 | 12.8 | 16.1 | 15 | 14.7 | 21 |
| Elongation at Break (%) | 249 | 280 | 408 | 327 | 251 | 198 | 174 |

As seen in Table 4, the nanocomposite made using the control Sample 1 with 15 percent by weight vinylpyridine VPSBR showed an excessively high cure rate as indicated by the RPA cure. Cure rates for Samples 2 through 7 were significantly lower than the control, and in a more acceptable range. The control Sample 1 also showed higher tan delta than did the inventive samples 2 through 7.

EXAMPLE VI

In this example, a clay nanocomposite of VPSBR Sample 4 containing 10 phr of clay is compared with rubber compositions containing the VPSBR of Sample 4 and various amounts of carbon black, but no clay. Samples 8-11 were compounded following the procedure of Example IV and tested for viscoelastic and physical properties with results shown in Table 5.

TABLE 5

VPSBR containing 4 percent 2-vinylpyridine

| | Sample No. | | | | |
|---|---|---|---|---|---|
| | 4 | 8 | 9 | 10 | 11 |
| Clay, phr | 10 | 0 | 0 | 0 | 0 |
| Carbon Black, phr | 0 | 30 | 40 | 50 | 60 |
| RPA 150° C. | | | | | |
| Cure 150° C., 30 min, 1.67 Hz and 3.5 percent | | | | | |
| Min S' (dN * m) | 1.42 | 0.98 | 1.42 | 2.2 | 3.15 |
| S" at Min Torque (dN * m) | 0.71 | 0.7 | 0.92 | 1.32 | 1.75 |
| Max S' (dN * m) | 10.2 | 9.1 | 11.8 | 15.8 | 19.8 |
| S" at Max Torque (dN * m) | 0.95 | 0.37 | 0.64 | 1.11 | 1.69 |
| Time to 2 Point Rise (min) | 2 | 4.09 | 3.44 | 2.35 | 1.59 |
| Time to 25% Cure (min) | 12.12 | 8.89 | 8.53 | 8.41 | 7.80 |
| Time to 90% Cure (min) | 20.6 | 16.7 | 16.2 | 16.2 | 15.7 |
| Cured Strain Sweep at 100° C. and 1 Hz | | | | | |
| G' at 1% (MPa) | 1.85 | 1.52 | 2.2 | 3.38 | 4.8 |
| G' at 5% (MPa) | 1.75 | 1.42 | 1.94 | 2.74 | 3.65 |
| G' at 10% (MPa) | 1.67 | 1.37 | 1.81 | 2.4 | 3.17 |
| G' at 15% (MPa) | 1.6 | 1.33 | 1.74 | 2.21 | 2.9 |
| G' at 50% (MPa) | 1.22 | 1.11 | 1.34 | 1.59 | 1.98 |
| Tan Delta at 1% | 0.095 | 0.052 | 0.077 | 0.102 | 0.124 |
| Tan Delta at 5% | 0.105 | 0.065 | 0.088 | 0.117 | 0.14 |
| Tan Delta at 10% | 0.114 | 0.068 | 0.09 | 0.132 | 0.144 |
| Tan Delta at 15% | 0.119 | 0.068 | 0.087 | 0.132 | 0.141 |
| Tan Delta at 50% | 0.16 | 0.082 | 0.108 | 0.151 | 0.165 |

TABLE 5-continued

VPSBR containing 4 percent 2-vinylpyridine

| | Sample No. | | | | |
|---|---|---|---|---|---|
| | 4 | 8 | 9 | 10 | 11 |
| UTS 150/50 | | | | | |
| 50% Modulus (MPa) | 2.66 | 1.59 | 2.09 | 2.73 | 3.29 |
| 100% Modulus (MPa) | 4.83 | 2.48 | 3.57 | 4.9 | 6.34 |
| 200% Modulus (MPa) | 10.49 | 6.16 | 9.59 | 13.15 | 17.04 |
| 300% Modulus (MPa) | 15.1 | 12.1 | 17.4 | 22.4 | 26.4 |
| Tensile Strength (MPa) | 16.1 | 19.7 | 20.8 | 26.2 | 27.3 |
| Elongation at Break (%) | 327 | 411 | 343 | 347 | 310 |

As seen in Table 5, Sample 4 made with 10 phr of clay showed comparable physical properties than the carbon black containing Samples 8 and 9 containing 30 and 40 phr of carbon black.

EXAMPLE VII

In this example, a clay nanocomposite of the VPSBR of Sample 6 containing 10 phr of clay is compared with rubber compositions containing the VPSBR of Sample 6 and various amounts of carbon black, but no clay. Samples 12-15 were compounded following the procedure of Example IV and tested for viscoelastic and physical properties with results shown in Table 5.

TABLE 6

VPSBR containing 2.5 percent 4-vinylpyridine

| | Sample No. | | | | |
|---|---|---|---|---|---|
| | 6 | 12 | 13 | 14 | 15 |
| Clay, phr | 10 | 0 | 0 | 0 | 0 |
| Carbon Black, phr | 0 | 30 | 40 | 50 | 60 |
| RPA 150° C. | | | | | |
| Cure 150° C., 30 min, 1.67 Hz and 3.5 percent | | | | | |
| Min S' (dN * m) | 1.86 | 1.05 | 1.37 | 1.92 | 2.87 |
| S" at Min Torque (dN * m) | 0.79 | 0.72 | 0.92 | 1.18 | 1.58 |
| Max S' (dN * m) | 10.2 | 10 | 12.4 | 15.8 | 20.7 |
| S" at Max Torque (dN * m) | 0.29 | 0.33 | 0.56 | 0.89 | 1.43 |
| Time to 2 Point Rise (min) | 2.44 | 4.87 | 3.67 | 2.9 | 1.72 |

TABLE 6-continued

VPSBR containing 2.5 percent 4-vinylpyridine

| | Sample No. | | | | |
|---|---|---|---|---|---|
| | 6 | 12 | 13 | 14 | 15 |
| Time to 25% Cure (min) | 15.25 | 8.2 | 7.7 | 7.19 | 6.47 |
| Time to 90% Cure (min) | 25.9 | 15.8 | 15 | 14.8 | 13.5 |
| Cured Strain Sweep at 100° C. and 1 Hz | | | | | |
| G' at 1% (MPa) | 1.59 | 1.65 | 2.26 | 3.24 | 4.86 |
| G' at 5% (MPa) | 1.55 | 1.57 | 2.03 | 2.72 | 3.77 |
| G' at 10% (MPa) | 1.53 | 1.52 | 1.92 | 2.48 | 3.31 |
| G' at 15% (MPa) | 1.5 | 1.48 | 1.84 | 2.32 | 3.06 |
| G' at 50% (MPa) | 1.27 | 1.22 | 1.43 | 1.73 | 2.14 |
| Tan Delta at 1% | 0.03 | 0.045 | 0.066 | 0.085 | 0.108 |
| Tan Delta at 5% | 0.032 | 0.051 | 0.073 | 0.099 | 0.125 |
| Tan Delta at 10% | 0.032 | 0.054 | 0.077 | 0.101 | 0.128 |
| Tan Delta at 15% | 0.033 | 0.054 | 0.077 | 0.102 | 0.123 |
| Tan Delta at 50% | 0.054 | 0.072 | 0.099 | 0.119 | 0.145 |
| UTS 150/40 | | | | | |
| 50% Modulus (MPa) | 3.01 | 1.75 | 2.23 | 2.97 | 3.76 |
| 100% Modulus (MPa) | 6.33 | 2.9 | 4.07 | 5.96 | 8.03 |
| 200% Modulus (MPa) | 15.09 | 7.53 | 11.12 | 16.14 | 20.21 |
| 300% Modulus (MPa) | — | 12 | — | — | — |
| Tensile Strength (MPa) | 14.7 | 13.3 | 16.9 | 19.3 | 21.3 |
| Elongation at Break (%) | 198 | 291 | 269 | 231 | 20 |

As seen in Table 6, Sample 6 made with 10 phr of clay showed comparable physical properties to Samples 12 through 15 containing much high concentrations of carbon black (30 to 60 phr). Sample 6 also showed a much lower tan delta than the carbon black containing samples.

While various embodiments are disclosed herein for practicing the invention, it will be apparent to those skilled in this art that various changes and modifications may be made therein without departing from the spirit or scope of the invention.

What is claimed is:

1. A process of preparing a nanocomposite comprised of an elastomer and at least partially exfoliated, intercalated water-swellable clay, comprising the steps of
(A) forming a first blend of water-swelled clay and anionic polymer particle emulsion by blending:
(1) an aqueous mixture comprised of water and a multilayered water-swellable clay, exclusive of an intercalant for said clay, wherein said water-swellable clay is comprised of a plurality of stacked platelets with water-expanded galleries between said platelets, wherein said galleries contain naturally occurring cationic ion exchangeable ions therein, and
(2) an emulsion of anionic synthetic vinylpyridine-styrene-butadiene terpolymer (VPSBR) elastomer particles as an aqueous pre-formed elastomer emulsion having a pH in a range of from about 6 to about 11, comprised of anionic elastomer particles (elastomer particles having anions on the surface derived from an anionic surfactant) prepared by aqueous free radical induced polymerization of monomers in the presence of a free radical generating polymerization initiator and non-polymerizable anionic surfactant,
wherein said synthetic elastomer particles are derived from an aqueous polymerization of said monomers comprising from about 0.1 to about 40 weight percent of styrene, from about 0.1 to about 8 percent by weight of vinylpyridine monomers which have the structural formula:

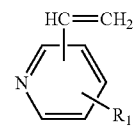

wherein $R_1$ represents a hydrogen atom or a straight chain or branched alkyl group containing 1 to 4 carbon atoms, and the balance 1,3 butadiene; and
(B) blending with said first blend an aqueous mixture comprised of water and inorganic acid having a pH in a range of about 1 to about 4.

2. The process of claim 1, wherein the vinylpyridine monomer comprises a member selected from the group consisting of 2-vinylpyridine, 3-vinylpyridine, 4-vinylpyridine, 6-methyl-2-vinylpyridine, 6-methyl-3-vinylpyridine, 5-methyl-2-vinylpyridine and 5-ethyl-2-vinylpyridine, and mixtures thereof.

3. The process of claim 1, wherein the vinylpyridine monomer comprises 4-vinylpyridine.

4. The process of claim 1, wherein the VPSBR comprises from about 0.5 to about 4 percent by weight of units derived from vinylpyridine monomer.

5. The process of claim 1, wherein the VPSBR comprises from about 0.5 to about 2 percent by weight of units derived from vinylpyridine monomer.

6. The process of claim 1, wherein the VPSBR comprises from about 60 percent to about 80 percent by weight of trans-1,4-butadiene, based on the polybutadiene content of the VPSBR.

7. The process of claim 1, wherein the VPSBR comprises from about 65 percent to about 75 percent by weight of trans-1,4-butadiene, based on the polybutadiene content of the VPSBR.

8. The process of claim 1, wherein the VPSBR comprises from about 68 percent to about 72 percent by weight of trans-1,4-butadiene, based on the polybutadiene content of the VPSBR.

9. The process of claim 1 wherein the clay is selected from the group consisting of montmorillonite, hectorite, nontrite, beidellite, volkonskoite, saponite, sauconite, sobockite, stensite, sinfordite, sepiolite, attapulgite, and synthetic clays.

* * * * *